May 12, 1953 — G. L. LARISON — 2,638,358
EQUALIZING AND CUSHIONING WHEEL MOUNTING
Filed Sept. 17, 1951 — 3 Sheets-Sheet 1

INVENTOR.
GLENN L LARISON
BY
ATTORNEY

May 12, 1953  G. L. LARISON  2,638,358
EQUALIZING AND CUSHIONING WHEEL MOUNTING
Filed Sept. 17, 1951  3 Sheets-Sheet 2

INVENTOR.
GLENN L LARISON
BY
ATTORNEY

May 12, 1953 G. L. LARISON 2,638,358
EQUALIZING AND CUSHIONING WHEEL MOUNTING
Filed Sept. 17, 1951 3 Sheets-Sheet 3
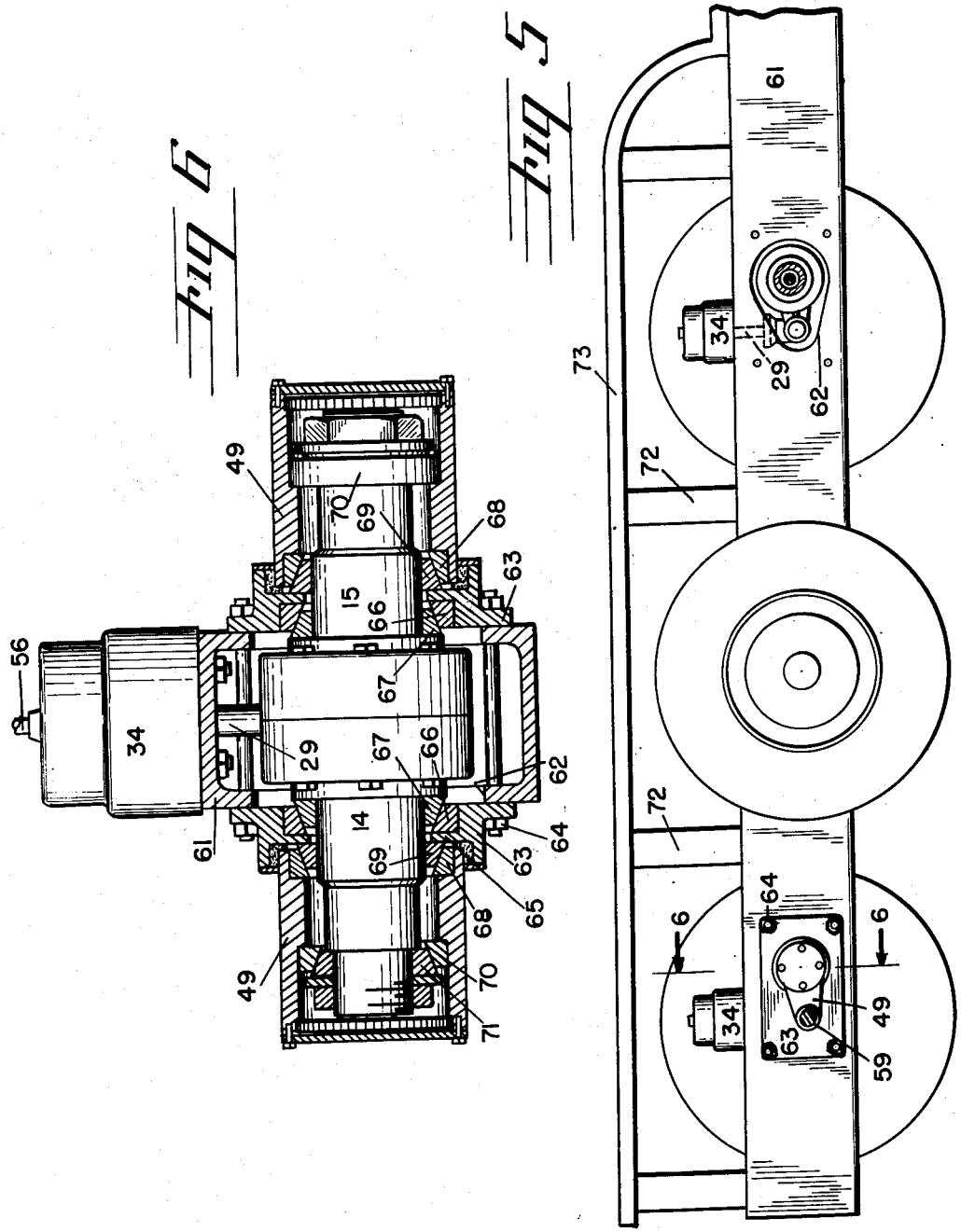
INVENTOR.
GLENN L. LARISON
ATTORNEY Patented May 12, 1953

2,638,358

UNITED STATES PATENT OFFICE 2,638,358

EQUALIZING AND CUSHIONING WHEEL MOUNTING

Glenn L. Larison, La Grande, Oreg., assignor to Larison Compensating Axle Corporation, La Grande, Oreg., a corporation of Oregon Application September 17, 1951, Serial No. 246,998

2 Claims. (Cl. 280—104.5)

This application is a continuation in part of my companion application, Serial No. 246,997, filed under date of September 17, 1951, and entitled "Compensating Wheel Mounting," to which reference should be made. Both applications relate in general to vehicle suspensions in which the wheels on each side of the vehicle are mounted in pairs with the two wheels of the pair carrying equal loads under all normal operating conditions and with the shocks transmitted from either or both of the wheels cushioned. My companion application describes also how a pair of wheel carrying assemblies can be mounted on each end of a "walking beam" so that the particular load then will be equally distributed among four wheels through the intermediary of the "walking beam" and the two pairs of wheel carrying assemblies. This application relates specifically to an improved vehicle suspension in which the load on one side of the vehicle similarly will be equally distributed among four wheels or two pairs of wheel carrying assemblies, but however without the use of a "walking beam."

A special object of the present invention accordingly is to provide an improved wheel suspension in which two pairs of wheel carrying assemblies, on one side of the vehicle, will be so connected by simple equalizing means that the load will be distributed equally among all four wheels although no actual "walking beam" is employed in the suspension.

A more specific object of this invention is to provide an equalizing wheel mounting in which two or more pairs of wheel-carrying assemblies, with the wheel spindles of each pair interconnected by compensating mechanism, will be arranged in tandem with the compensating mechanisms of the pairs so connected as to produce equalization of the load among all of the wheel carrying assemblies.

Another object of this invention is to provide an equalizing wheel mounting of the type above indicated in which the load will, not only be evenly distributed among all of the wheels in question but in which the shocks transmitted to the vehicle from any or all of the wheels will be cushioned.

A further object of this invention is to provide a cushioning as well as equalizing wheel mounting involving four or more separate wheels in which no springs will be required.

An additional object is to provide a cushioning and equalizing wheel mounting in which the amount of cushioning or shock absorption can be adjusted to suit different loads or conditions.

In the following description of the present invention reference is made to the accompanying drawings, in which.

Fig. 5 is a fragmentary side elevation of the rear portion of a "low bed" vehicle in which three pairs of wheels are mounted on each side of the vehicle in accordance with my invention, one of the near side wheels and one entire near side wheel spindle assembly and frame side plate removed for the sake of clarity; and Fig. 6 is a section through one of the pairs of wheel-carrying assemblies and main frame member taken on line 6—6 of Fig. 5 and drawn to a larger scale.

Figures 1, 2:
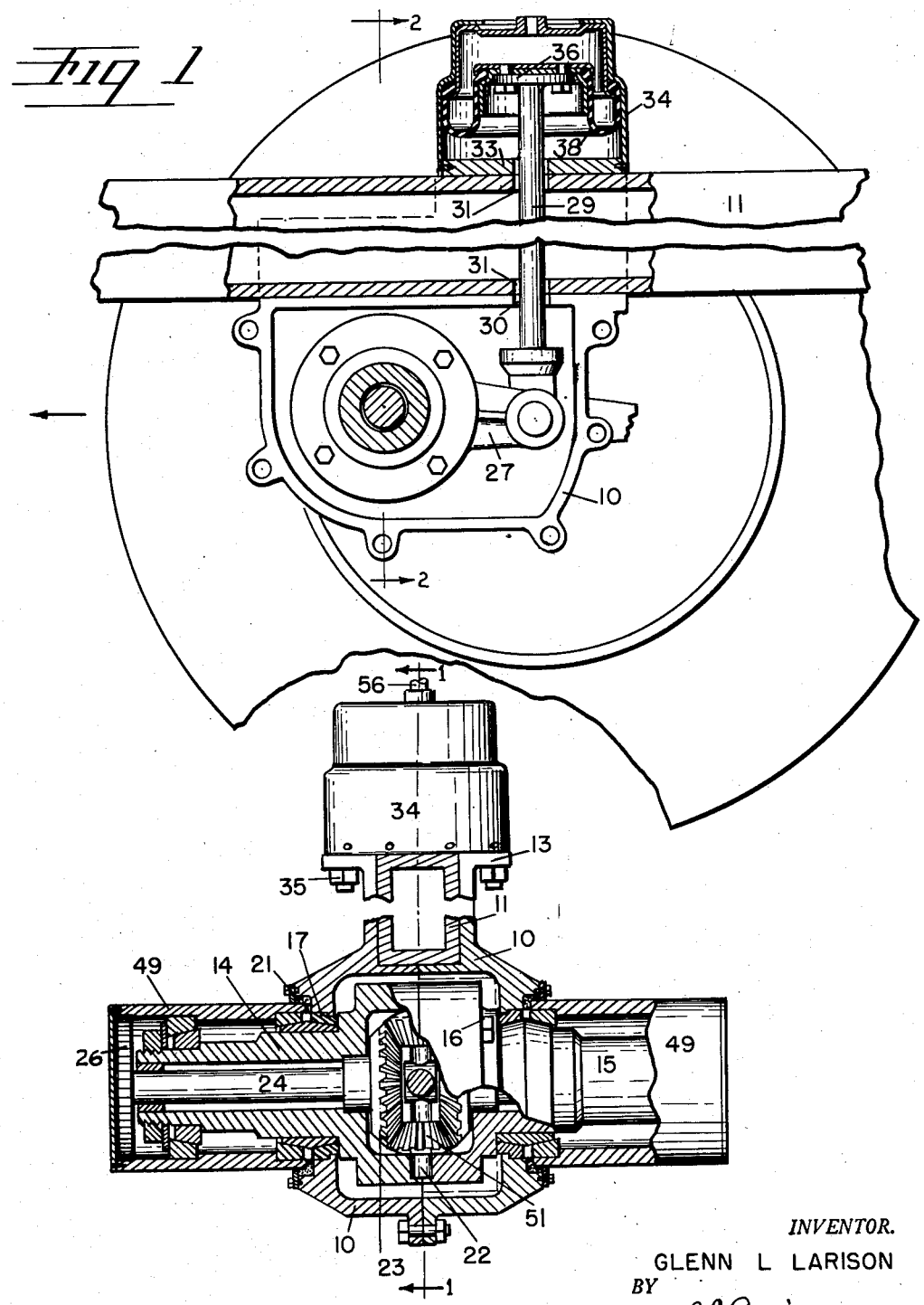
Fig. 1 is a sectional side elevation of one of the pairs of compensating wheel assemblies in my improved equalizing and cushioning mounting, the section being taken approximately on the longitudinal center line of the mounting and corresponding to the line 1—1 of Fig. 2, this section also being taken on a line such as indicated at 1—1 on Fig. 3.
Fig. 2 is an end elevation, partly in section, of the compensating mechanism connecting each pair of wheel carrying assemblies, this section corresponding to line 2—2 of Fig. 1 but with the two wheels entirely omitted from the drawing for the sake of clarity.

Referring first to Figs. 1 and 2, each pair of wheel carrying assemblies and compensating mechanism by which they are interconnected are mounted in place on the vehicle by means of a mounting bracket and housing 10 which is attached to the main side frame member 11 of the vehicle. The bracket housing 10 comprises a pair of companion half sections which are bolted together and the upper portions of these companion sections extend around the opposite lateral sides of the vehicle frame member 11 and are bolted to the frame member. While the frame member may be of any suitable construction, it is assumed to be of the preferred box channel form indicated in Fig. 2. The two companion housing sections extend up to the plane of the top face of the channel member 11 and terminate in outwardly-extending horizontal flanges 13 (Fig. 2).

A hollow, composite, rotatable supporting means (Fig. 2), comprising two identical sections 14 and 15, which sections are secured together by bolts 16, is rotatably mounted within the bracket housing 10. The bracket housing 10 has circular openings at each side to accommodate the elongated hubs of the sections 14 and 15 respectively, and suitable bearings between these sections and the adjacent portions of the housing bracket permit rotation of this composite rotatable supporting means in the bracket housing 10.

A differential mechanism, or compensating mechanism, is located within the composite rotatable supporting means, and this mechanism includes differential pinions 51 journaled on stub shafts 22, a pair of differential gears 23 meshing with the pinion 51, and a pair of shafts 24 secured to the gears 23 and extending through the elongated hubs of the sections 14 and 15 respectively of the rotatable supporting means.

A wheel-spindle-carrying arm 49 is rotatably journaled on each of the elongated hubs of the sections 14 and 15 of the rotatable supporting means by suitable bearings, as indicated in Fig. 2, and sealing rings 21 are interposed between the arms 49 and the adjacent surrounding flanges of the bracket housing 10 to prevent leakage of lubricant from the bracket housing. Each wheel-spindle arm 49 carries a wheel-spindle 59 (see Figs. 3 and 4).

The outer ends of the shafts 24 (Fig. 2) of the differential mechanism terminate in enlarged circumferential flanges 26. Teeth in the periphery of these flanges engage corresponding teeth in the arms 49 so that the arms 49 are firmly connected with the shafts 24 respectively.

A pair of rigid arms 27, one of which is shown in Fig. 1, extend rearwardly from the enlarged inner portions of sections 14 and 15 respectively. An upwardly-extending thrust rod 29 has its lower end pivotally connected to the pair of arms 27. This thrust rod 29 extends upwardly through an enlarged opening 30 in the bracket housing 10, thence through openings 31 in the bottom and top of the vehicle frame member 11, thence through a corresponding opening in a circular plate 33, and into a closed and substantially cylindrical housing 34 mounted above the frame member 11.

The circular plate 33 is held in place on the vehicle frame member 11 by bolts 35 (Fig. 2) extending through the top flanges 13 of the bracket housing 10. The housing 34 is secured on the circular plate 33 by suitable screws as indicated. The upper end of the thrust rod 29 (Fig. 1) is formed with a circular piston-like flange 36. A strong flexible diaphragm 38 is secured on the top of this flange and its outer rim is securely clamped against a shoulder on the inside of the housing 34, causing the space above the diaphragm and piston-like flange 36 to constitute an air compression chamber.

The differential mechanism illustrated in Fig. 2, as will be readily understood and as explained more fully in my above mentioned companion application, is so arranged that upward movement of one of the spindle-carrying arms 49 will result in relative opposite movement of the connected other spindle-carrying arm, and movement of both spindle-carrying arms in the same direction will result in causing the composite supporting means, comprising the two sections 14 and 15, to be rotated in the same direction with the spindle-carrying arms. The wheel spindles 59, carried by the spindle arms 49 are located on the same side of the composite supporting means as the pivotal connection between the bottom end of the thrust rod 29 and the arms 27 of the composite supporting means (Fig. 1). Consequently the tendency for the composite supporting means to rotate will cause a force to be exerted in an upward direction on the thrust rod 29 under all normal conditions, and every shock transmitted from the wheel assemblies to the differential mechanism and thence to the composite supporting means will in turn result in an upward thrust on the thrust rod 29. The amount of air pressure in the air compression chamber in the top of the housing 34 will determine the extent to which such shocks are cushioned.

Further details of the cushioning mounting for the pair of wheel carrying assemblies thus far described are given in my above mentioned companion application.

Figure 3:
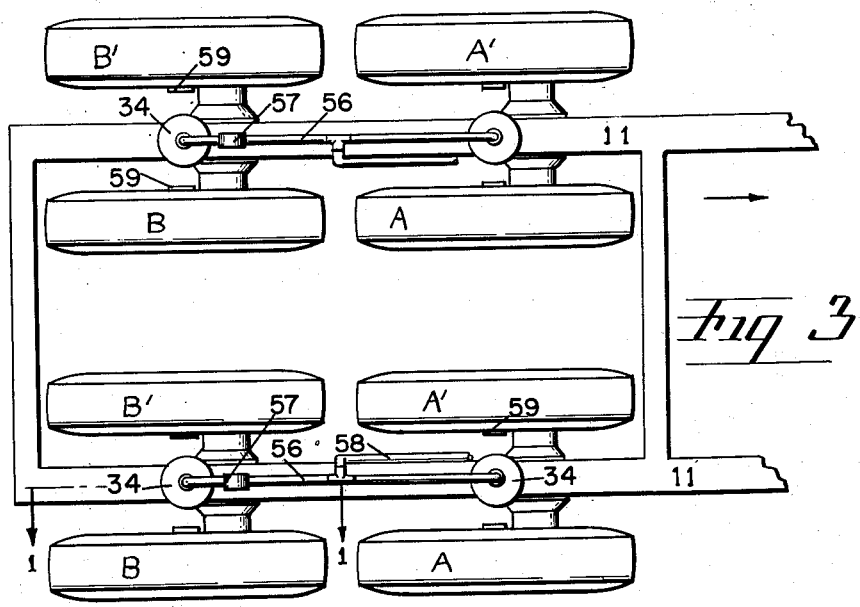
Fig. 3 is a more or less diagrammatic top plan view of a portion of a vehicle frame illustrating my equalizing and cushioning wheel mounting, embodying two pairs of wheels, attached to the frame at each side of the vehicle.
Figure 4:
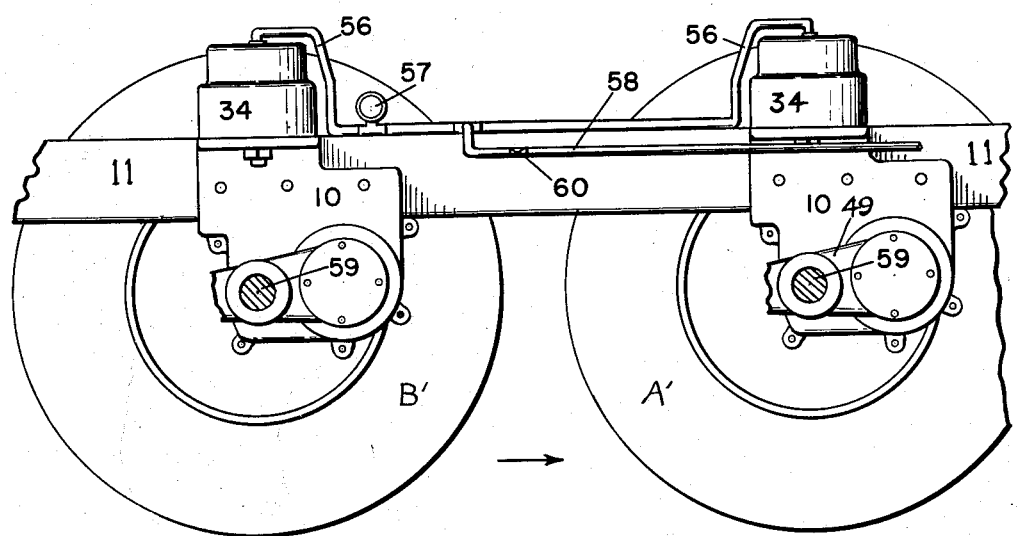
Fig. 4 is a fragmentary side elevation, drawn to a larger scale, of the vehicle suspension of Fig. 3 with the near side wheels removed for the sake of clarity and with all brake mechanism for the wheels omitted.

Referring now to Figs. 3 and 4, the frame of the vehicle, including a main longitudinally-extending side frame member 11 at each side is supported on both sides of the vehicle by a forward pair of wheels A, A' and by a rear pair of wheels B, B', in tandem arrangement with the forward pair of wheels on the respective sides of the vehicle.

The wheel-spindle-arms for each pair of wheels are mounted on a composite supporting means and are interconnected by a differential mechanism as described, and upward thrusts of the wheels and wheel-spindle-arms of each pair will be transferred to upward thrusts on a thrust rod, which thrusts will in turn be cushioned by air in the compressed air chamber in the upper portion of the respective housing 34. An air pipe 56 connects the two compressed air chambers in the two housings 34 on the same side of the vehicle. This connecting air pipe 56 permits air to pass from one compressed air chamber to the other and thus causes the air pressure in both air chambers to be equalized. An air supply pipe line 58 is connected to the pipe 56 and the pipe line 58 at its other end (not shown) is adapted to be connected to any source of compressed air, either in the vehicle itself or outside of the vehicle. A suitable shut off valve (indicated at 60 in Fig. 4) is provided to shut off the passage of air to or from the pipe 56 and the connected air chambers. Preferably an air gauge 57 is connected with the pipe 56 to indicate the air pressure in the two air chambers.

Since the compensating or differential mechanism by which the wheel-spindles in each pair are interconnected causes each wheel or pair to carry an equal load, and since the upward thrusts on the spindle-carrying-arms result in compression of the air in the compressed air chamber, and since such compressed air is free to pass from the compressed air chamber of one pair of wheel assemblies to the chamber for the other pair of wheel assemblies, and thus equalize the pressure in both air chambers, it will be apparent that the load on that side of the vehicle will be equally divided among the four wheels. Furthermore, if both wheels of a pair, for example the forward wheels A, A' on one side of a vehicle were to be raised simultaneously, the resulting rotation of the composite supporting means on which their wheel-spindle-arms are mounted, would force the connected thrust rod upwardly, increasing the air pressure in the related air compression chamber. This would produce some flow of air into the air chamber for the rear pair of wheel-carrying assemblies on the same side of the vehicle and this increase of air pressure in this second air chamber would tend to cause the spindle-carrying arms for the corresponding rear wheels B, B' to move downwardly.

Thus with the two air chambers connected in this manner the resulting effect is the same as if the two pairs of wheel carrying assemblies were mounted on the end of a "walking beam." Also the compressibility of the air in the two connected air chambers not only cushions and reduces the shocks transmitted from each of the wheels of each pair but also cushions the shocks transmitted from one pair of wheel assemblies to the other pair of wheel assemblies on the same side of the vehicle.

As in the case of the single pair of wheel assemblies, more fully described in my above mentioned companion application, adjustment of the air pressure in the compressed air chambers in my equalized and cushioning wheel mounting will enable the vehicle to be adjusted to accommodate different loads. Similarly also the air gauge 57 attached to the pipe 56, in addition to enabling the air pressure to be adjusted to a desired predetermined amount for a particular load and particular hauling conditions, can also be utilized as a means for measuring the amount of load carried by the four wheels at that side of the vehicle.

Should the vehicle be obliged to travel on a road which slopes decidedly down to one side only, as in the case of some narrow logging or mountain roads, the air pressure in the air chambers on the low side can be increased in order to lift that side of the vehicle frame further above the ground, thus bringing the vehicle more into equilibrium, distributing the load more evenly between the two sides, and reducing the possibility of the loaded vehicle becoming overbalanced.

My invention can be used very satisfactorily and efficiently in the wheel suspension of a "low bed" vehicle of the type commonly employed for moving heavy objects, such as logging engines, heavy machinery, etc., for which purpose it is necessary to have the bed and load-carrying platform of the vehicle as close to the ground as possible. The elimination of springs and walking beams and the fact that the entire mechanism employed in my invention is so compact enable the vehicle bed to be mounted much lower than would be possible with the customary vehicle suspensions. Furthermore, with my invention, the load at each side of the vehicle may be equally distributed not only among two pairs of wheel assemblies, but among three or more pairs as may be desired, and as will be apparent from Fig. 5.

Referring to Figs. 5 and 6, a main longitudinally-extending side frame member, preferably in the form of a large box channel member, is indicated at 61. Openings 62 (Fig. 5) are cut in the opposite side faces of the frame member 61 for each compensating mechanism, preferably the openings 62 being of the shape shown in Fig. 5 so that the compensating mechanism and rotatable supporting means with the arms 27 can be readily inserted through the frame member 61 without having the openings any larger than necessary. Side plates 63 are then bolted to each side of the frame member by bolts 64, the side plates 63 being formed with flanged round openings, as shown in Fig. 6, to provide suitable mountings for bearings. Thus each side plate has an inner vertical annular flange 65 for retaining a bearing cone 66 supporting the bearing cone 67. Other bearing cones 68, 69 and 70, 71 provide the necessary bearings for the spindle-carrying arms 49 on the parts 14 and 15 of the rotatable supporting means. Each rotatable supporting means, as previously described has a pair of rigid arms 27 to which a thrust rod 29 is connected, and each thrust rod extends up through the top of the frame member 61 and into a housing 34 provided with an air chamber. The air chambers are connected by the pipe line 56 so that the air pressure in all three air chambers is constantly equalized. Thus the load at that portion of the vehicle is equally distributed among the three pairs of wheels in the same manner that the vehicle load at each side of the vehicle in Figs. 3 and 4 is distributed among the two pairs of wheels.

Since the main frame member 61 is of sufficient size to provide a mounting for rotatable supporting means and compensating mechanism the bracket housing 10 of Figs. 1–4 is dispensed with. As a result the main frame member is approximately no higher from the ground than the wheel axles. At the same time the cushioning and desired distribution of the load equally among the pairs of wheel assemblies, as well as the other features of my invention previously mentioned herein and also in the companion application are retained.

The "low-bed" vehicle in Fig. 5 is shown having the customary transverse struts 72 supporting the top load-carrying deck 73.

I claim:

1. In a vehicle suspension a longitudinally-extending frame member located on one side of the vehicle, a plurality of pairs of housing plates secured to said frame member at a spaced distance along said frame member, the plates of each pair secured to opposite sides of said frame member in transverse alignment with each other, a differential mechanism carried in each pair of housing plates for rotational movement as an entire unit on a substantially horizontal axis extending transversely with respect to said frame member, a pair of wheel-spindle arms mounted on the outside of each pair of said housing plates respectively on the same horizontal axis as said differential mechanism and connected to said differential mechanism, said differential mechanism so arranged that upward movement of one of the wheel-spindle arms of the pair will cause relative opposite movement of the other wheel-spindle arm and upward movement of both wheel-spindle arms of the pair will cause rotational movement of said differential mechanism as an entire unit, said wheel-spindle arms extending rearwardly with respect to the normal direction of travel of the vehicle, a thrust rod extending substantially vertically upwardly through said frame member at each pair of said housing plates, the bottom end of said thrust rod located between the pair of housing plates and positioned slightly to the rear of the central portion of the corresponding differential mechanism with respect to the normal direction of travel of the vehicle, means connecting the bottom end of said thrust rod with said differential mechanism, whereby rotation of said differential mechanism as an entire unit by upward movement of the two wheel-spindle arms will cause an upward thrust to be exerted on said thrust rod, an air chamber housing secured on said frame member above each pair of said housing plates, said thrust rod terminating in said air chamber housing, a compressed air chamber in said air chamber housing, air compression means actuated by said thrust rod compressing the air in said air chamber and cushioning the upward thrust of said thrust rod, an air conduit interconnecting said air chambers for equalizing the air pressure therein, and means for adjusting the air pressure in said chambers and conduit.

2. In a vehicle suspension a longitudinally-extending frame member located on one side of the vehicle, a plurality of pairs of housing plates secured to said frame member at a spaced distance along said frame member, the plates of each pair secured to opposite sides of said frame member in transverse alignment with each other, a supporting means mounted in each pair of said housing plates for rotational movement on a substantially horizontal axis, an opening in each plate and said supporting means extending through said openings and positioned transversely with respect to said frame member, a differential mechanism in each of said supporting means, a pair of wheel-spindle arms mounted at the outside of each pair of said housing plates respectively on said supporting means and on the same horizontal axis as said supporting means and said differential mechanism and connected to said differential mechanism, said differential mechanism and said supporting means so connected and arranged that upward movement of one of the wheel-spindle arms of the pair will cause relative opposite movement of the other wheel-spindle arm and upward movement of both wheel-spindle arms of the pair will cause rotational movement of said supporting means, said wheel-spindle arms extending rearwardly with respect to the normal direction of travel of the vehicle, a thrust rod extending substantially vertically upwardly through said frame member at each pair of said housing plates, the bottom end of said thrust rod located between the pair of housing plates and positioned slightly to the rear of the central portion of the corresponding supporting means with respect to the normal direction of travel of the vehicle, means connecting the bottom end of said thrust rod to said supporting means, whereby rotation of said supporting means and differential mechanism by upward movement of the two wheel-spindle arms will cause an upward thrust to be exerted on said thrust rod, an air chamber housing secured on said frame member above each pair of said housing plates, said thrust rod terminating in said air chamber housing, a compressed air chamber in said air chamber housing, air compression means actuated by said thrust rod compressing the air in said air chamber and cushioning the upward thrust of said thrust rod, an air conduit interconnecting said air chambers for equalizing the air pressure therein, and means for adjusting the air pressure in said chambers and conduit.

GLENN L. LARISON.

References Cited in the file of this patent
UNITED STATES PATENTS

| Number | Name | Date |
|---|---|---|
| 1,747,902 | Marcum | Feb. 18, 1930 |
| 1,940,914 | Marcum | Dec. 26, 1933 |
| 2,013,994 | Schutte | Sept. 10, 1935 |
| 2,411,885 | Larison | Dec. 3, 1946 |